US012500338B2

(12) United States Patent
Lee et al.

(10) Patent No.: US 12,500,338 B2
(45) Date of Patent: Dec. 16, 2025

(54) 5G BAND TRANSMISSIVE BODY AND WINDOW ASSEMBLY INCLUDING THE SAME

(71) Applicant: CENTER FOR ADVANCED META-MATERIALS, Daejeon (KR)

(72) Inventors: Chang Hyeong Lee, Daejeon (KR); Lee Kyo Jeong, Daejeon (KR); Hak Joo Lee, Daejeon (KR)

(73) Assignee: CENTER FOR ADVANCED META-MATERIALS, Daejeon (KR)

( * ) Notice: Subject to any disclaimer, the term of this patent is extended or adjusted under 35 U.S.C. 154(b) by 103 days.

(21) Appl. No.: 18/570,644

(22) PCT Filed: Sep. 26, 2022

(86) PCT No.: PCT/KR2022/014327
§ 371 (c)(1),
(2) Date: Dec. 15, 2023

(87) PCT Pub. No.: WO2023/085595
PCT Pub. Date: May 19, 2023

(65) Prior Publication Data
US 2024/0283151 A1 Aug. 22, 2024

(30) Foreign Application Priority Data
Nov. 11, 2021 (KR) ........................ 10-2021-0154484
Feb. 28, 2022 (KR) ........................ 10-2022-0026376

(51) Int. Cl.
*H01Q 1/12* (2006.01)
*H01Q 1/32* (2006.01)
(Continued)

(52) U.S. Cl.
CPC ................. *H01Q 5/25* (2015.01); *H01Q 1/32* (2013.01); *H01Q 1/38* (2013.01)

(58) Field of Classification Search
CPC .. H01Q 5/25; H01Q 1/32; H01Q 1/38; H01Q 1/1278; H01Q 1/325; H01Q 15/0013; H01Q 1/1271
See application file for complete search history.

(56) References Cited

U.S. PATENT DOCUMENTS

2003/0112190 A1 6/2003 Baliarda et al.
2010/0201584 A1* 8/2010 Schaffner ............. H01Q 1/1271 343/713
(Continued)

FOREIGN PATENT DOCUMENTS

CN 112787065 A 5/2021
KR 10-2003-0014388 A 2/2003
(Continued)

OTHER PUBLICATIONS

International Search Report of PCT/KR2022/014327 mailed Jan. 5, 2023.

*Primary Examiner* — David E Lotter
(74) *Attorney, Agent, or Firm* — Revolution IP, PLLC

(57) ABSTRACT

A 5G band transmissive body includes a base substrate and a pattern portion, wherein the pattern portion is provided on one side of the base substrate and transmits the 5G communication frequency band, and includes a conductive pattern formed by providing a conductive material on a plurality of virtual grid cells arranged in the horizontal and vertical directions, and a plurality of unit areas divided by a virtual vertical line and a virtual horizontal line, which are orthogonally crossing at center of the pattern portion, and a pair of virtual diagonal lines and crossing each other at the center and passing through the corners of the pattern portion, and the conductive pattern is symmetrical with respect to each of the vertical line, horizontal line, or diagonal line in the neighboring unit areas among the plurality of unit areas.

9 Claims, 12 Drawing Sheets

(51) Int. Cl.
*H01Q 1/38* (2006.01)
*H01Q 5/25* (2015.01)

(56) References Cited

U.S. PATENT DOCUMENTS

| | | | | |
|---|---|---|---|---|
| 2016/0134008 | A1* | 5/2016 | Kim | H01Q 21/28<br>343/711 |
| 2021/0191011 | A1* | 6/2021 | Morita | B32B 17/10036 |

FOREIGN PATENT DOCUMENTS

| | | | |
|---|---|---|---|
| KR | 10-2016-0054848 | A | 5/2016 |
| KR | 10-2021-0132359 | A | 11/2021 |

* cited by examiner (a)

(b)

5G BAND TRANSMISSIVE BODY AND WINDOW ASSEMBLY INCLUDING THE SAME

CROSS REFERENCE TO PRIOR APPLICATIONS

This application is a National Stage Application of PCT International Patent Application No. PCT/KR2022/014327 filed on Sep. 26, 2022, under 35 U.S.C. § 371, which claims priority to Korean Patent Application Nos. 10-2021-0154484 filed Nov. 11, 2021 and 10-2022-0026376 filed on Feb. 28, 2022, respectively, which are all hereby incorporated by reference in their entirety.

TECHNICAL FIELD

The present invention relates to a 5th Generation (5G) band transmissive body and a window assembly including the same, and more particularly, to a 5G band transmissive body with high transmittance and low reflectance in a 5G band and a window assembly including the 5G band transmissive body.

BACKGROUND ART

Recently, vehicles have evolved beyond simply transporting goods and people to include audio and video devices for drivers to enjoy entertainment while driving, as well as navigation devices to display the route to their destination.

Additionally, there is an increasing need for vehicles to communicate with external devices or other vehicles. For example, the necessity for Vehicle-to-Vehicle communication between preceding and following vehicles is increasing.

To facilitate smooth communication between preceding and following vehicles, it is desirable to place antennas for wireless signal transmission and reception at the front and rear of the vehicle.

Meanwhile, with its maximum speed of 20 Gbps, 5G communication technology enables the implementation of technologies such as virtual reality, autonomous driving, and the Internet of Things through its ultra-low latency and ultra-connectivity, leading to ongoing attempts to apply 5G communication technology to vehicle-to-vehicle communication and other areas.

However, in recent vehicles, there is an issue where the installation of additional electronic devices to implement more functionalities can create noise, leading to an impediment in the smooth operation of 5G communication. Such issues can also arise in buildings, not just limited to vehicles.

DISCLOSURE

Technical Problem

In order to achieve the above objects, the present invention aims to provide a window assembly incorporating a 5G band transmissive body with high transmittance and low reflectance in 5G bands.

The objects of the present invention are not limited to the aforesaid, and other objects not described herein with can be clearly understood by those skilled in the art from the descriptions below.

Technical Solution

In order to accomplish the above objects, an embodiment of the present invention provides a $5^{th}$ Generation (5G) band transmissive body including a base substrate and a pattern portion provided on one side of the base substrate and transmitting 5G communication frequency band, wherein the pattern portion includes a conductive pattern formed by providing conductive material in a plurality of virtual grid cells arranged in the horizontal and vertical directions and a plurality of unit areas divided by a virtual vertical line and a virtual horizontal line, which are orthogonally crossing at center of the pattern portion, and a pair of virtual diagonal lines crossing each other at the center and passing through the corners of the pattern portion, the conductive pattern being symmetrical with respect to each of the vertical line, horizontal line, or diagonal line in the neighboring unit areas among the plurality of unit areas.

In an embodiment of the present invention, the grid cells may have the same size in the horizontal and vertical directions and may be arranged in equal numbers in both the horizontal and vertical directions.

In an embodiment of the present invention, the conductive pattern may include an edge pattern formed of conductive material continuous on the grid cells arranged at the edges among the plurality of grid cells.

In an embodiment of the present invention, the conductive pattern may include a center pattern formed of conductive material on at least one of the plurality of grid cells located in the central area.

In an embodiment of the present invention, the conductive pattern may heat up based on voltage being applied.

In an embodiment of the present invention, at least one of the plurality of grid cells may form a unit cell pattern based on the conductive material being provided, and the conductive pattern may include an auxiliary pattern formed, on one side of the base substrate, to increase a connected area between a pair of unit cell patterns adjacent in diagonal direction.

In an embodiment of the present invention, the auxiliary pattern may be formed with an area smaller than that of the unit cell pattern.

In an embodiment of the present invention, the auxiliary pattern may be formed in pairs on each side with respect to the contact point of the unit cell patterns.

In an embodiment of the present invention, the 5G band transmissive body may further include an auxiliary pattern portion formed on the other side of the base substrate and transmitting the 5G communication frequency band.

In order to accomplish the above objects, an embodiment of the present invention provides a window assembly including a pair of glass substrates, the 5G band transmissive body provided between the pair of glass substrates, and an adhesive layer provided between the 5G band transmissive body and the glass substrate.

Advantageous Effects

According to an embodiment of the present invention, a conductive pattern formed by the provision of conductive material in a virtual grid cell is advantageous in terms of ensuring effective transmission of 5G communication frequency band.

Also, according to an embodiment of the present invention, the conductive pattern is advantageous in terms of being heated, allowing the 5G band transmissive body to achieve additional effects such as defrosting when applied to vehicle windows.

It should be understood that the advantages of the present invention are not limited to the aforesaid but include all advantages that can be inferred from the detailed description of the present invention or the configuration specified in the claims.

MODE FOR INVENTION

Figure 1:
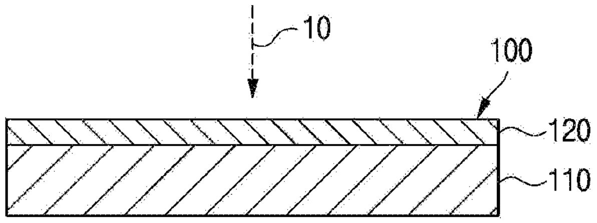
FIG. 1 is a cross-sectional view illustrating a 5G band transmissive body according to an embodiment of the present invention.

Hereinafter, the present invention will be described with reference to the accompanying drawings. However, the present invention may be embodied in many different forms and is not limited to the embodiments described herein. In order to clearly describe the present invention, parts irrelevant to the description may be omitted in the drawings, and similar reference numerals may be used for similar components throughout the specification.

Throughout the specification, when a part is said to be "connected (coupled, contacted, or combined)" with another part, this is not only "directly connected", but also "indirectly connected" with another member in between. Also, when a part is said to "comprise" a certain component, this means that other components may be further included instead of excluding other components unless specifically stated otherwise.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprises" or "has," when used in this specification, specify the presence of a stated feature, number, step, operation, component, element, or a combination thereof, but they do not preclude the presence or addition of one or more other features, numbers, steps, operations, components, elements, or combinations thereof.

Hereinafter, embodiments of the present invention will be described in detail with reference to the accompanying drawings.

Figure 2:
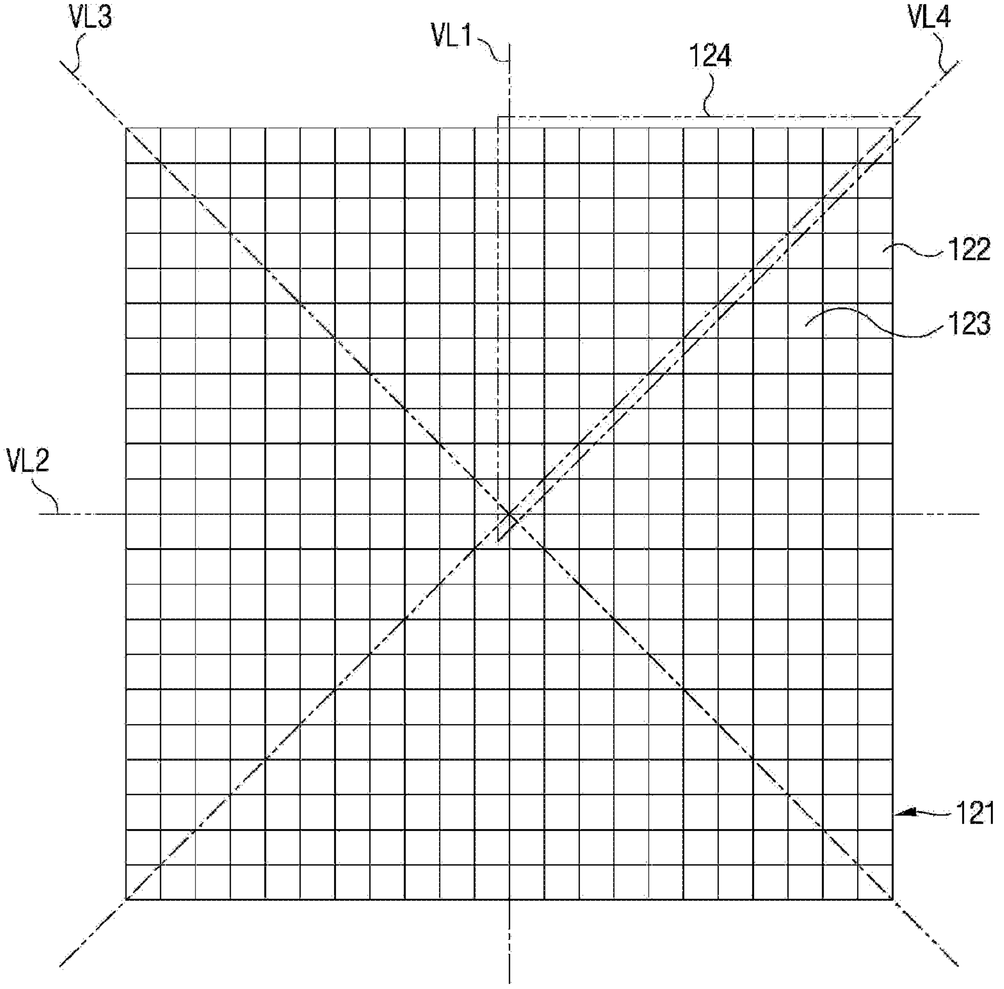
FIG. 2 is a plan view illustrating virtual grid cells of the pattern portion of a 5G band transmissive body according to an embodiment of the present invention.
Figure 3:
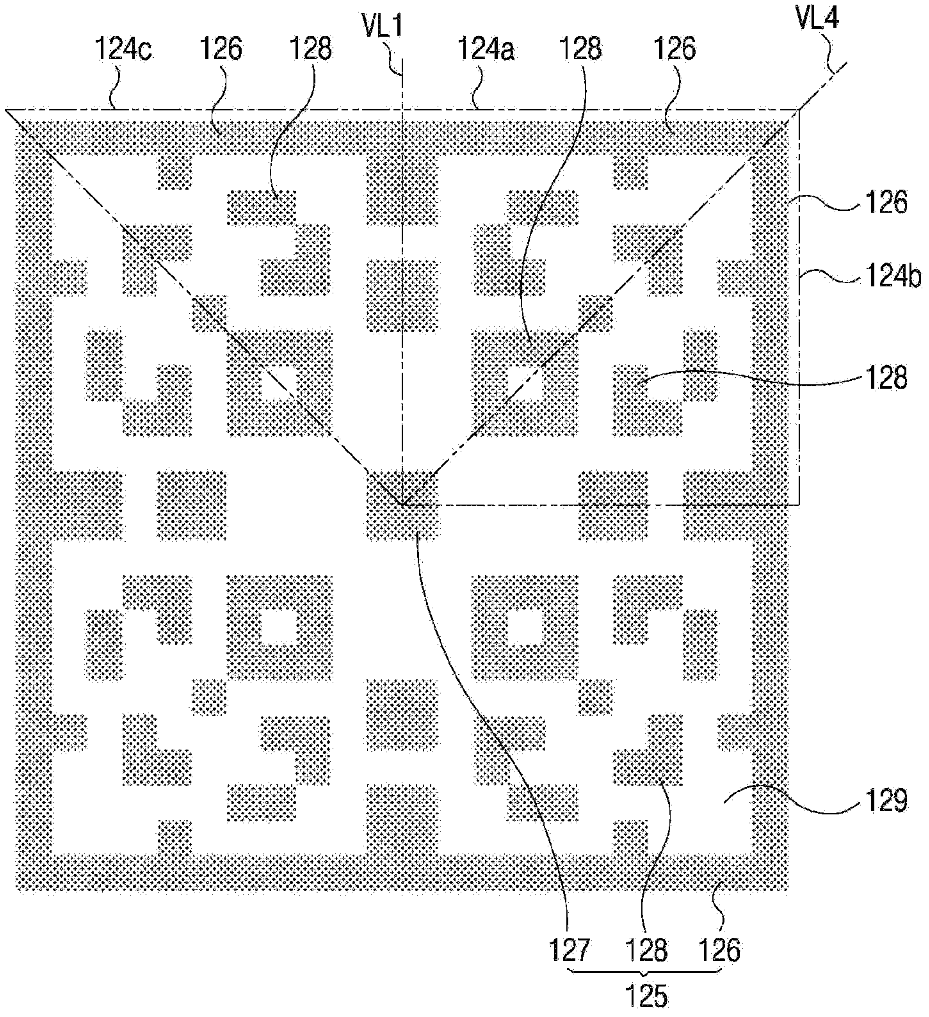
FIG. 3 is a plan view illustrating a conductive pattern of the pattern portion of a 5G band transmissive body according to an embodiment of the present invention.

FIG. 1 is a cross-sectional view illustrating a 5G band transmissive body according to an embodiment of the present invention, FIG. 2 is a plan view illustrating virtual grid cells of the pattern portion of a 5G band transmissive body according to an embodiment of the present invention, and FIG. 3 is a plan view illustrating a conductive pattern of the pattern portion of a 5G band transmissive body according to an embodiment of the present invention.

As shown in FIGS. 1 to 3, the 5G band transmissive body according to this example may include a base substrate 110 and a pattern portion 120.

The base substrate 110 can be in the form of a film and may be formed of a composite material such as polyethylene terephthalate (PET).

The pattern portion 120 may be arranged on one side of the base substrate 110.

The incident wave 10 of the 5G communication frequency band may enter the pattern portion 120 in the direction of the base substrate 110.

The pattern portion 120 may include a conductive pattern 125 and may transmit the 5G communication frequency band.

The 5G band may be divided into Frequency Range 1 (FR1) of sub-6 GHz frequency range and Frequency Range 2 (FR2) of mmWave frequency range (24-100 GHz), and this embodiment is focused on 5G operating in FR2 with a target frequency range from 26.5 to 28.9 GHZ.

The conductive pattern 125 may be formed by providing conductive material in a virtual grid cell. In more detail, the conductive pattern 125 may be formed by providing the conductive material in some of a plurality of virtual grid cells.

With reference to FIG. 2, the entire grid 121 may be composed of a plurality of virtual grid cells 122 and 123 arranged in the horizontal and vertical directions.

The grid cells 122 and 123 may include edge grid cells 122 forming the edge portion of the entire grid 121 and inner grid cells 123 surrounded the edge grid cells 122.

The grid cells 122 and 123 may be square-shaped with the same size in the horizontal and vertical directions. In this embodiment, the grid cells 122 and 123 may have a length of 0.2 mm in both horizontal and vertical directions.

Additionally, the grid cells 122 and 123 may be arranged in equal numbers in the horizontal and vertical directions, resulting in the entire grid 121 being square-shaped. In this embodiment, the grid cells 122 and 123 may be arranged in 22 rows and 22 columns. Consequently, the entire grid 121 may also be square-shaped, and both the horizontal and vertical length of the entire grid 121 may be 4.4 mm. The conductive pattern 125 depicted in FIG. 3 may be a unit conductive pattern.

The pattern portion 120 may be composed of a plurality of unit areas 124 divided by a virtual vertical line VL1 and a virtual horizontal line VL2, which are orthogonally crossing at center of the pattern portion 120, and a pair of virtual diagonal lines VL3 and VL4 crossing each other at the center and passing through the corners of the pattern portion 120. In this embodiment, since the entire grid 121 is formed in a square shape, the virtual diagonal lines VL3 and VL4 may orthogonally intersect at the center of the pattern portion 120.

Accordingly, with reference to FIG. 2, the unit areas 124 may all have the same size and shape, and eight unit areas 124 may be formed. The unit areas 124 arranged on both sides with respect to the vertical line VL1, horizontal line VL2, or any of the diagonals VL3 and VL4 may be symmetrically formed.

Accordingly, as seen in FIG. 3, the conductive pattern formed in adjacent unit areas 124*a*, 124*b*, and 124*c* may be symmetrical with respect to each vertical line VL1, horizontal line VL2, or diagonal line VL3 or VL4.

The conductive pattern 125 may include edge patterns 126, center patterns 127, and inner patterns 128.

The edge patterns 126 may be formed of conductive material arranged in edge grid cells 122, which are positioned on the periphery of the entire grid 121. The edge patterns 126 may be formed continuously along the edge of the pattern portion 120.

The center patterns 127 may be formed of conductive material arranged in at least one grid cell, which is located in the central area of the entire grid 121. That is, the center patterns 127 may be filled in the grid cells at the central area among the inner grid cells 123. Accordingly, the center patterns 127 may be formed at the center of the pattern portion 120.

The inner patterns 128 may be formed of conductive material arranged in some of the inner grid cells 123. The inner patterns 128 may be patterns excluding the edge patterns 126 and the center patterns 127.

The edge patterns 126, center patterns 127, and inner patterns 128 may all be formed to have the same thickness.

Moreover, the conductive patterns 125 formed in adjacent unit areas may be symmetrical in shape with respect to the vertical line VL1, horizontal line VL2, or diagonal line VL3 or VL4.

In FIG. 3, considering the conductive patterns formed in the unit areas 124*a* and 124*b* that are symmetrical with respect to the virtual diagonal line VL4, the conductive patterns 125 formed in the unit area 124*a* on the left side of the diagonal line VL4 and the conductive patterns 125 formed in the unit area 124*b* on the right side of the diagonal line VL4 may be symmetrical with respect to the diagonal line VL4.

Therefore, the edge patterns 126, center patterns 127, and inner patterns 128 formed in the unit area 124*a* on the left side of the diagonal line VL4 may be symmetrical with the edge patterns 126, center patterns 127, and inner patterns 128 formed in the unit area 124*b* on the right side of the diagonal line VL4.

Meanwhile, since the unit area 124*a* on the left side of the diagonal line VL4 is positioned on the right side with respect to the vertical line VL1, the edge patterns 126, center patterns 127, and inner patterns 128 formed in the unit area 124*c* positioned on the left side of the vertical line VL1 may also be symmetrical therewith.

The conductive patterns 125 in the pattern portion 120 may transmit the 5G communication frequency band. The non-conductive region 129 without the conductive patterns 125 in the pattern portion 120 may transmit visible light. The non-conductive region 129 may be a blank area.

The conductive material forming the conductive patterns 125 may include materials such as ITO, graphene, and metals containing copper.

Furthermore, the conductive patterns 125 may be formed by printing on the base substrate 110 through a printing process or by being manufactured in the form of a film and then attached to the base substrate 110.

Additionally, the conductive patterns 125 may be heated when voltage is applied.

Figure 4:
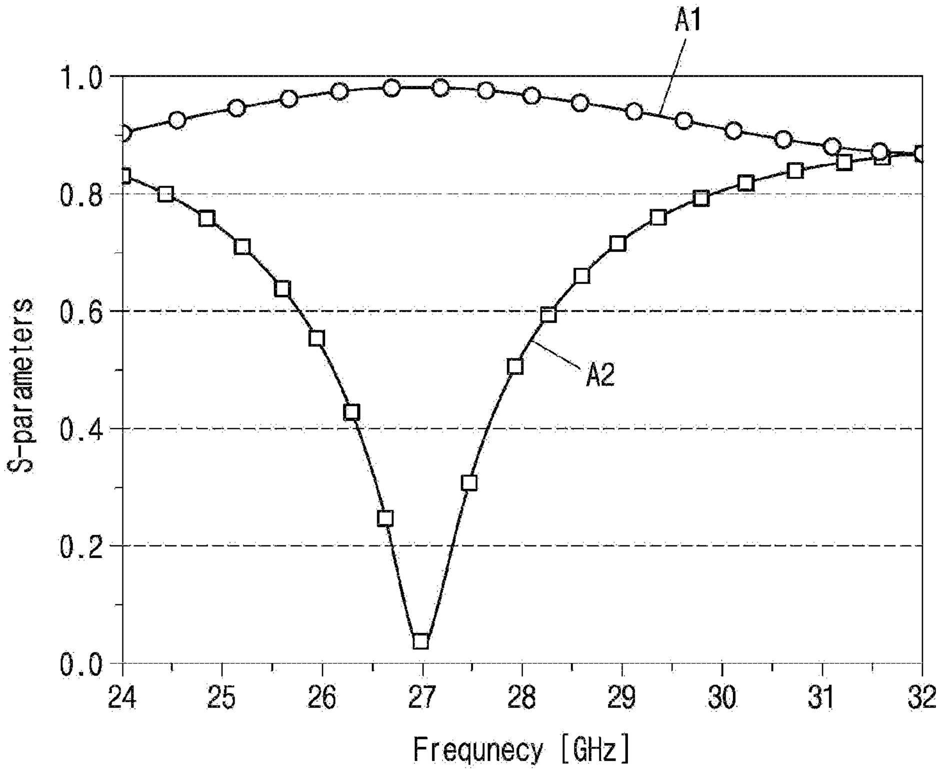
FIG. 4 is a graph illustrating the transmittance and reflectance performance of the pattern portion of FIG. 3.

FIG. 4 is a graph illustrating the transmittance and reflectance performance of the pattern portion of FIG. 3, particularly the transmittance A1 and reflectance A2 in the case where the conductive pattern is formed of copper and applied with a surface resistance of 8 ohms/sq.

As shown in FIG. 4, the 5G band transmissive body 100 with the pattern portion 120 of FIG. 3 can achieve a transmittance of 90% or more and a reflectance of 10% or less at the target frequency range of 26.5 to 28.9 GHz in the 5G communication frequency band.

Figure 5:
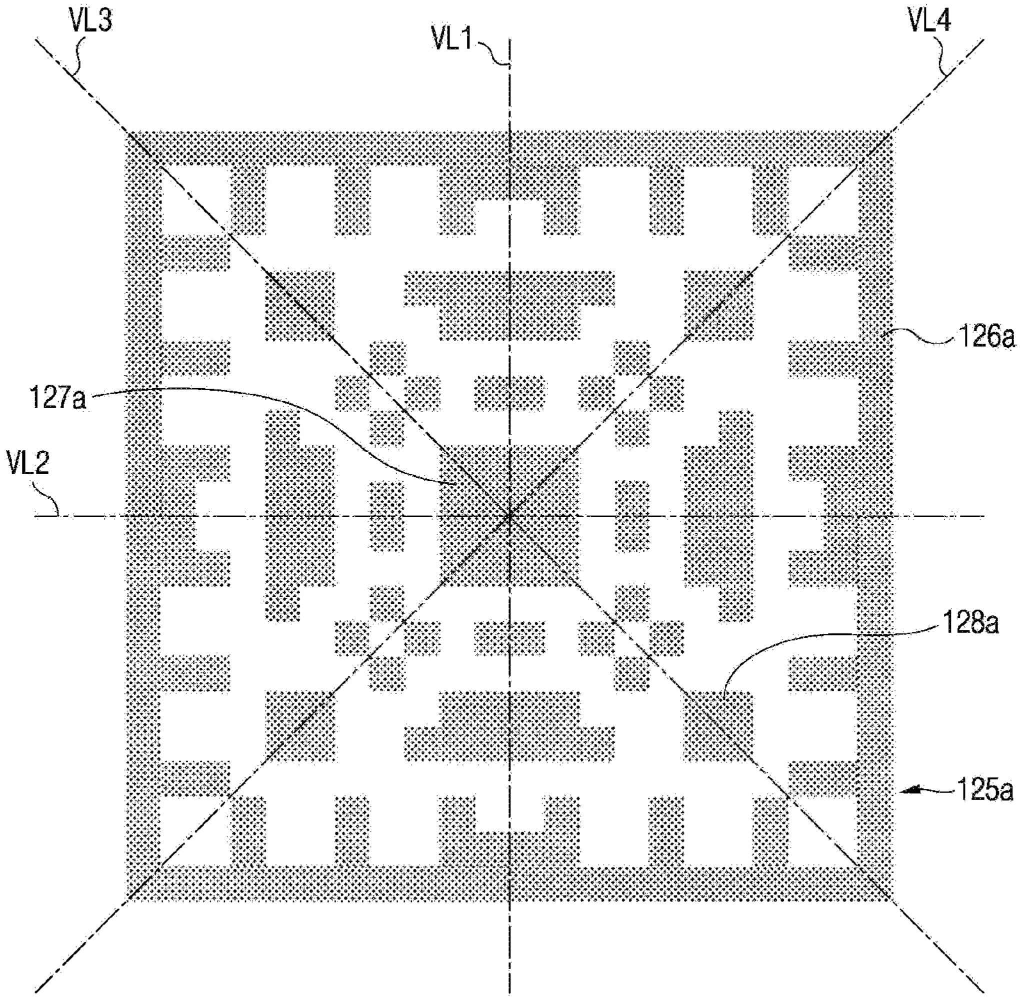
FIG. 5 is a plan view illustrating a conductive pattern of the pattern portion of a 5G band transmissive body according to another embodiment of the present invention.

FIG. 5 is a plan view illustrating a conductive pattern of the pattern portion of a 5G band transmissive body according to another embodiment of the present invention.

The conductive pattern 125*a* in FIG. 5 may have the same characteristics as the previously described conductive pattern, but in this example, the conductive pattern 125*a* may be formed of ITO. Through this, the conductive pattern 125*a* may be transparent, and the 5G band transmissive body may also have transparency.

In addition, the conductive pattern 125*a* according to this embodiment may also have edge patterns 126*a*, center patterns 127*a*, and inner patterns 128*a*, and conductive patterns formed adjacent with respect to the vertical line VL1, horizontal line VL2, or diagonal lines VL3 or VL4 may be symmetrical with each other.

Figure 6:
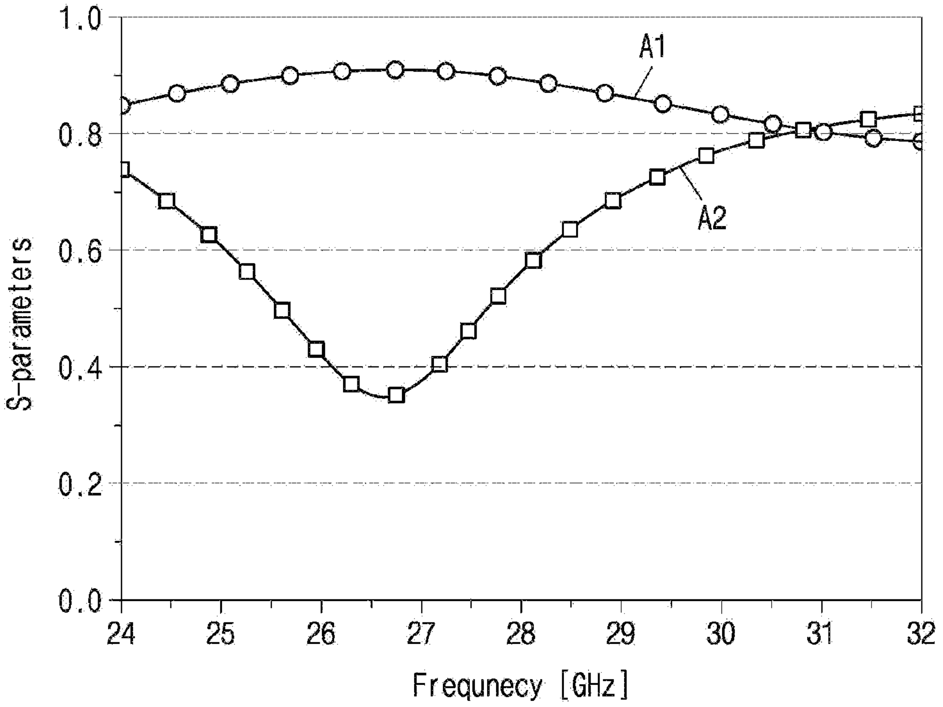
FIG. 6 is a graph illustrating the transmittance and reflectance performance of the pattern portion of FIG. 5.

FIG. 6 is a graph illustrating the transmittance and reflectance performance of the pattern portion of FIG. 5. The graph in FIG. 6 represents the transmittance A1 and reflectance A2 when a surface resistance of 8 ohms/square is applied to the pattern portion of FIG. 5.

As observed in FIG. 6, although the insertion loss increases when forming the conductive pattern with ITO compared to when the conductive pattern is formed of copper due to lower conductivity, it is still possible to achieve a transmittance of over 90% and a reflectance of less than 10% in the target frequency range of 26.5 to 28.9 GHZ.

Figure 7:
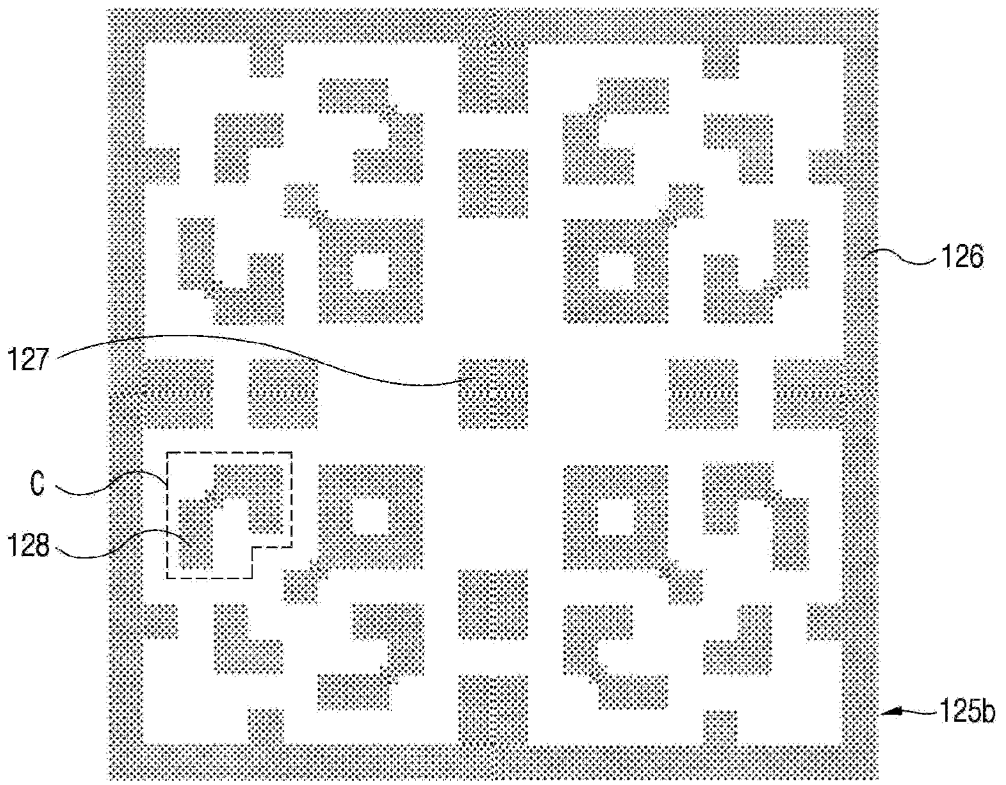
FIG. 7 is a plan view illustrating a pattern portion of a 5G band transmissive body according to still another embodiment of the present invention.
Figure 8:
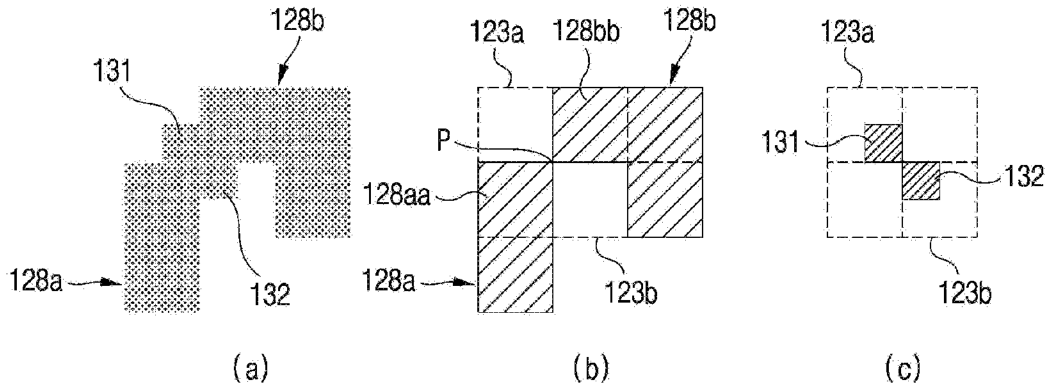
FIG. 8 is a diagram illustrating area C in FIG. 7.

FIG. 7 is a plan view illustrating a pattern portion of a 5G band transmissive body according to still another embodiment of the present invention, and the conductive pattern in FIG. 7 further includes additional auxiliary patterns compared to the conductive pattern in FIG. 3. FIG. 8 is a diagram illustrating area C in FIG. 7, where (a) of FIG. 8 is an enlarged view of part C of FIG. 7, (b) of FIG. 8 is an illustrative drawing of the state without auxiliary patterns 131 and 132 in (a) of FIG. 8, and (c) of FIG. 8 is an illustrative drawing of only the auxiliary patterns 131 and 132 in (a) of FIG. 8.

As shown in FIGS. 7 and 8, the conductive pattern 125*b* may have auxiliary patterns 131 and 132 formed of the conductive material.

As described above, the conductive pattern is formed by providing a conductive material in a plurality of grid cells, and here, the pattern formed by providing conductive material in a single grid cell is defined as a 'unit cell pattern'.

Accordingly, the inner pattern 128*a* on the left side in the area C consists of 2 unit cell patterns, and the inner pattern 128*b* on the right side consists of 3 unit cell patterns. In addition, the upper unit cell pattern 128*aa* of the inner pattern 128*a* on the left and the left unit cell pattern 128*bb* of the inner pattern 128*b* on the right are arranged to be adjacent in a diagonal direction and are in contact at point P (refer to (b) of FIG. 8).

The conductive pattern may be heated when voltage is applied, and when a plurality of internal patterns 128*a* and 128*b* are in point contact in this way, it may be disadvantageous to conduction.

To address this, auxiliary patterns 131 and 132 may be further provided. The auxiliary patterns 131 and 132 may be used to connect a pair of unit cell patterns 128*aa* and 128*bb* that are adjacent in a diagonal direction.

When the auxiliary patterns 131 and 132 are provided to connect the unit cell patterns 128*aa* and 128*bb* that are in point contact, the auxiliary patterns 131 and 132 may increase the connected area by ensuring that the unit cell patterns 128*aa* and 128*bb* adjacent in a diagonal direction are in surface contact rather than point contact, which may be advantageous for conduction.

In addition, the formation of auxiliary patterns 131 and 132 may increase the proportion of conductive material, leading to a wider pattern area being heated and thereby increasing heating efficiency. Consequently, when such 5G band transmissive bodies are applied to vehicle windows, anti-fogging effects may be further enhanced.

The auxiliary patterns 131 and 132 may be formed on one side of the base substrate along with the edge patterns, center patterns, and inner patterns to have the same thickness as the edge patterns, center patterns, and inner patterns.

The auxiliary patterns 131 and 132 may be formed in pairs on each side with respect to the contact point P of the unit cell patterns 128*aa* and 128*bb*. That is, with reference to (c) of FIG. 8, one auxiliary pattern 131 may be formed on the upper left grid cell 123*a* with respect to the contact point P, and the other auxiliary pattern 132 may be formed on the lower right grid cell 123*b* with respect to the contact point P.

The auxiliary patterns 131 and 132 may be formed to have an area smaller than that of the unit cell patterns 128*aa* and 128*bb*, for example, an area one-fourth the size of the unit cell patterns 128*aa* and 128*bb*.

Although the auxiliary patterns 131 and 132 are illustrated connecting between internal patterns, the auxiliary patterns 131 and 132 may also connect between internal patterns and edge patterns or between internal patterns and center patterns. In addition, the auxiliary patterns 131 and 132 are not limited to a rectangular shape and may also be formed in a triangular shape.

The auxiliary patterns 131 and 132 may be formed together when forming edge patterns, inner patterns, and center patterns.

Figure 9:
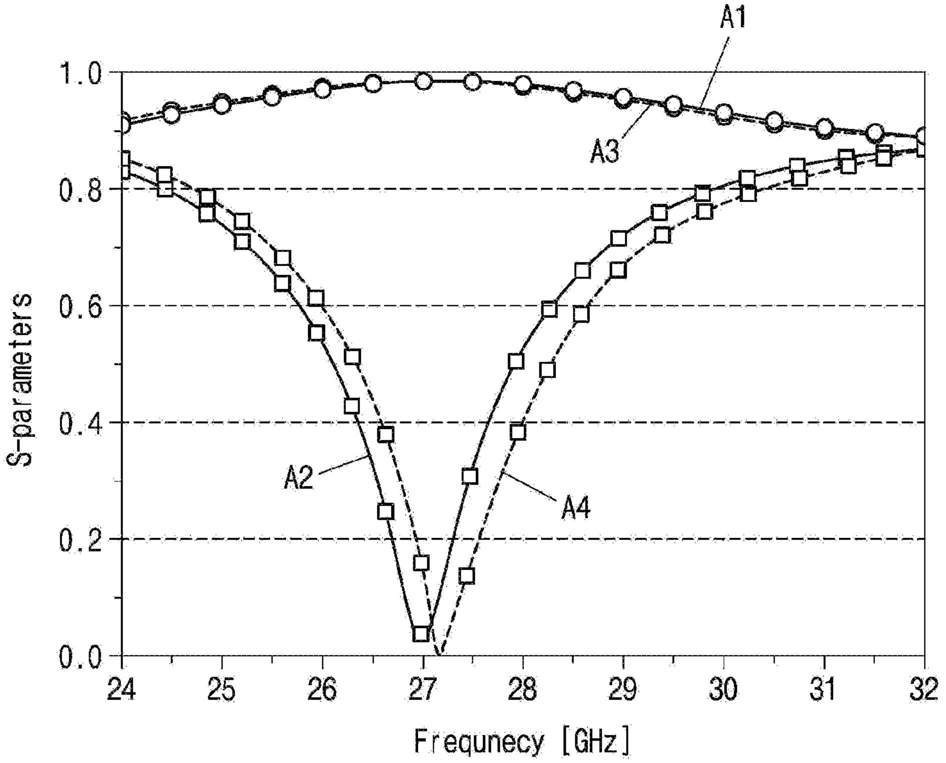
FIG. 9 is a graph comparing the transmittance and reflectance performances of the pattern portions of FIGS. 3 and 7.

FIG. 9 is a graph comparing the transmittance and reflectance performances of the pattern portions of FIGS. 3 and 7.

As shown in FIG. 9, comparing the transmittance A1 and reflectance A2 of the conductive pattern in the state where the auxiliary patterns 131 and 132 are omitted from the conductive pattern of FIG. 7, i.e., the conductive pattern in FIG. 3, with the transmittance A3 and reflectance A4 of the conductive pattern in the state where the auxiliary patterns 131 and 132 are formed, it is evident that even in the state where the auxiliary patterns 131 are 132 are formed, a transmittance of over 90% and a reflectance of less than 10% can be achieved in the target frequency range of 26.5 to 28.9 GHZ.

Figure 10:
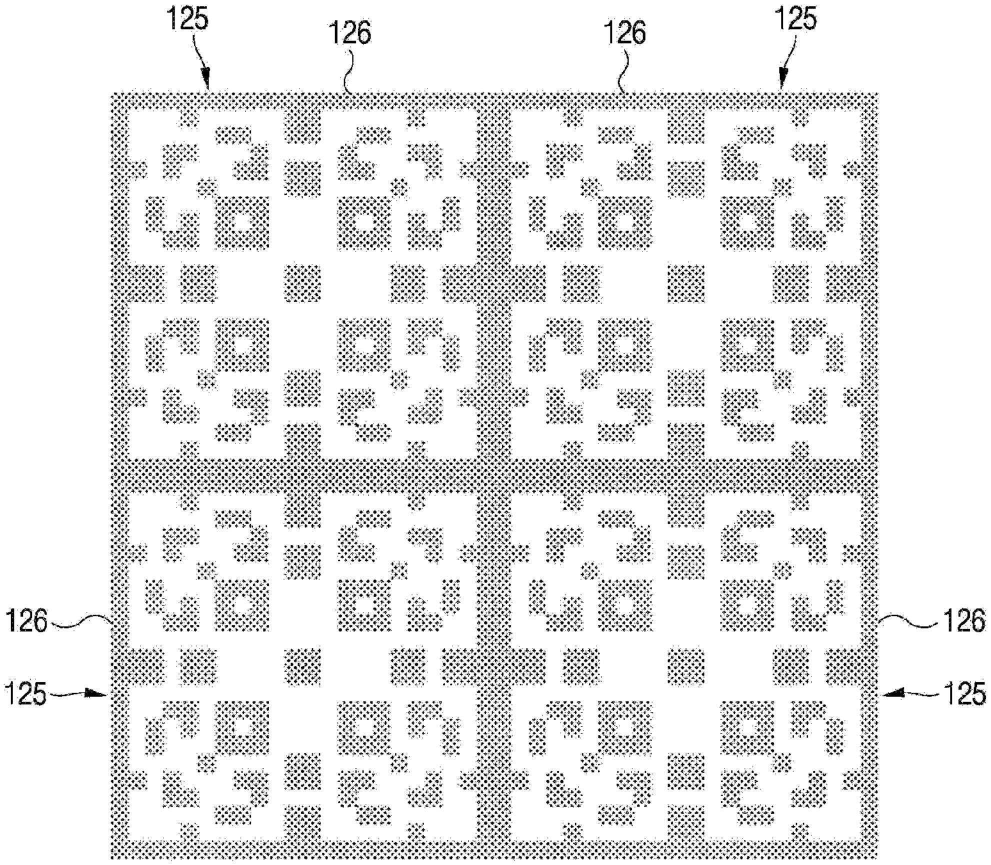
FIG. 10 is a plan view illustrating exemplary application of a 5G band transmissive body according to an embodiment of the present invention.

FIG. 10 is a plan view illustrating exemplary application of a 5G band transmissive body according to an embodiment of the present invention.

As show in FIG. 10, a plurality of conductive patterns 125 may be arranged in adjacency with each other, and in this case, the edge patterns 126 of each conductive pattern 125 may be connected to the edge patterns 126 of neighboring conductive patterns 125.

Consequently, all the edge patterns 126 of the conductive patterns 125 may be interconnected, allowing for use in a large-area 5G band transmissive body.

In addition, as all the edge patterns 126 of the conductive pattern 125*s* are interconnected, all the conductive patterns 125 may be heated when voltage is applied.

Figure 11:
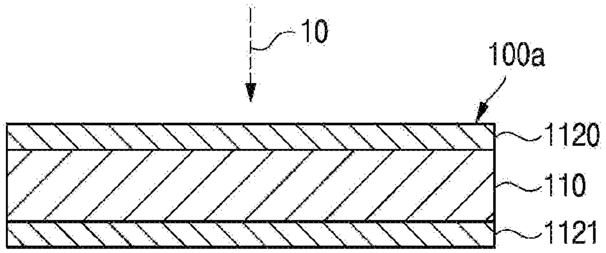
FIG. 11 is a cross-sectional view illustrating a 5G band transmissive body according to another embodiment of the present invention.
Figure 12:
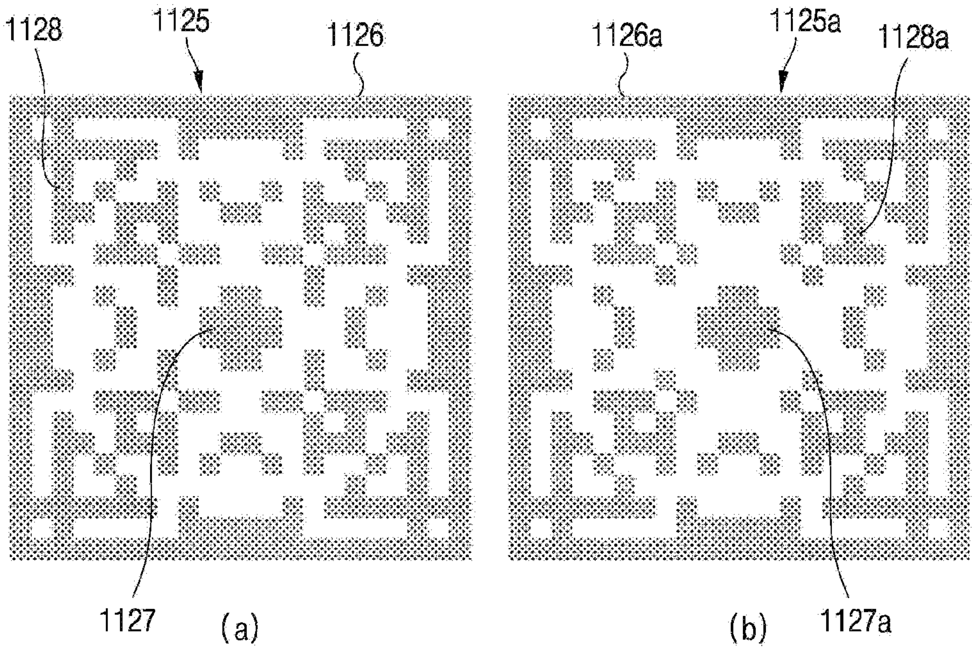
FIG. 12 is plan view illustrating a conductive pattern of the pattern portion of a 5G band transmissive body according to another embodiment of the present invention.
Figure 13:
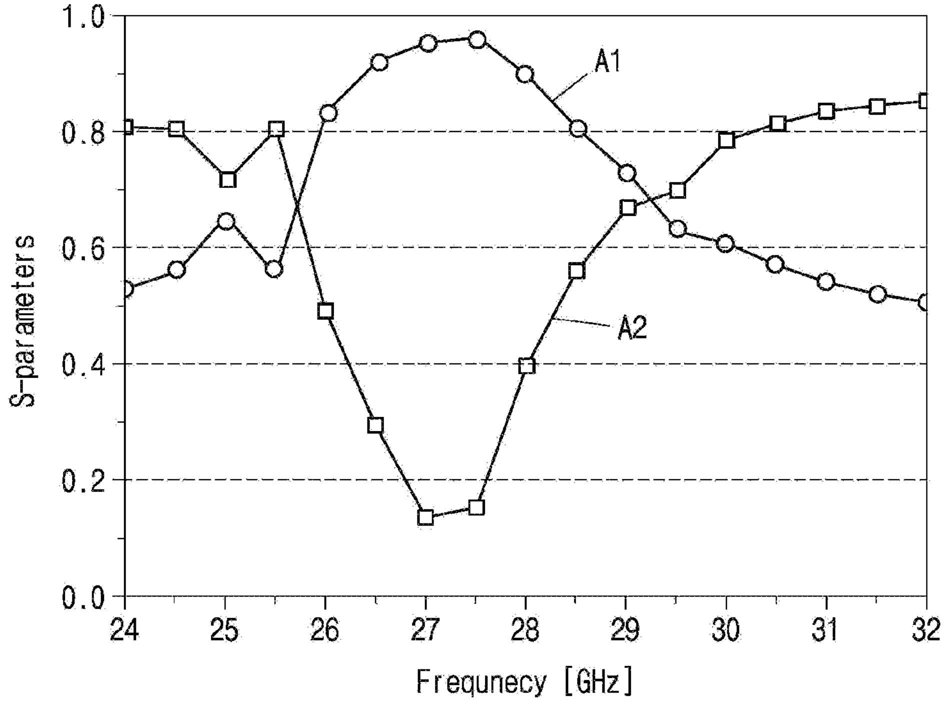
FIG. 13 is a graph illustrating the transmittance and reflectance performance of the pattern portion of FIG. 12.

FIG. 11 is a cross-sectional view illustrating a 5G band transmissive body according to another embodiment of the present invention, FIG. 12 is a plan view illustrating a conductive pattern of the pattern portion of a 5G band transmissive body according to another embodiment of the present invention, and FIG. 13 is a graph illustrating the transmittance and reflectance performance of the pattern portion of FIG. 12. In this embodiment, the pattern portion may be provided on both sides of the base substrate, and redundant details described in the previous embodiments will be omitted whenever possible.

As shown in FIGS. 11 to 13, the 5G band transmissive body 100*a* according to this embodiment may include a pattern portion 1120 provided on one side of the base substrate 110 and an additional pattern portion 1121 provided on the other side of the base substrate 110.

The description related to the pattern portion 1120 may be commonly applicable to the additional pattern portion 1121. That is, just as the pattern portion 1120 has a conductive pattern 1125 formed with a border pattern 1126, a center pattern 1127, and an inner pattern 1128, the additional pattern portion 1121 may also have a conductive pattern 1125*a* formed with a border pattern 1126*a*, a center pattern 1127*a*, and an inner pattern 1128*a*.

However, in this embodiment, the conductive pattern 1125 of the pattern portion 1120 and the conductive pattern 1125*a* of the additional pattern portion 1121 may differ in shape from each other.

In addition, the conductive pattern 1125 of the pattern portion 1120 may have a smaller aperture ratio and a higher conductor ratio compared to the conductive pattern 1125*a* of the additional pattern portion 1121.

As observed in FIG. 13, the 5G band transmissive body 100*a* according to this embodiment can also achieve excellent performance with a transmittance A1 of 90% or more and a reflectance A2 of 20% or less in the target frequency range of 26.5 to 28.9 GHz.

Figure 14:
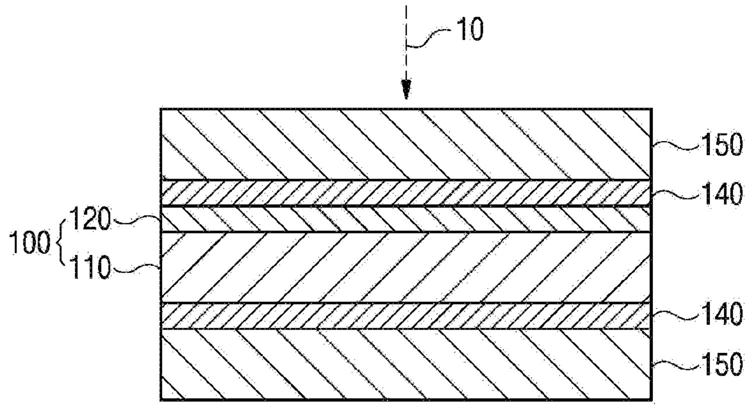
FIG. 14 is a cross-sectional view illustrating a window assembly according to an embodiment of the present invention.
Figure 14:
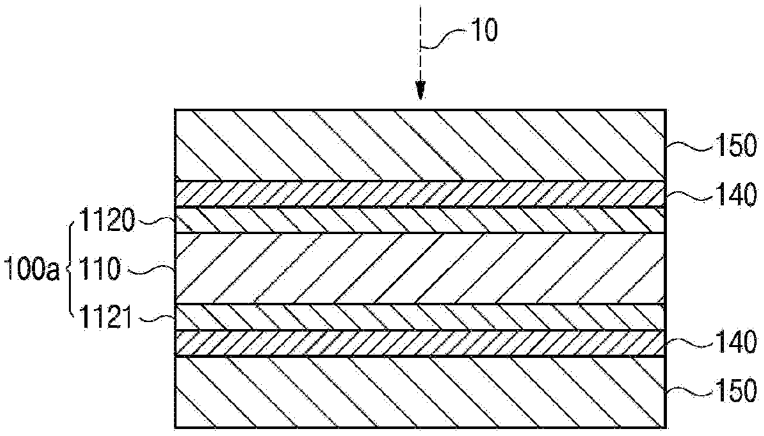

FIG. 14 is a cross-sectional view illustrating a window assembly according to an embodiment of the present invention. (a) of FIG. 14 is a cross-sectional view of a window assembly including a 5G band transmissive body with a single pattern portion, and (b) of FIG. 14 is a cross-sectional view of a window assembly including a 5G band transmissive body with a pattern portion and an additional pattern portion.

As shown in (a) of FIG. 14, the window assembly may include a glass substrate 150, a 5G band transmissive body 100, and an adhesive layer 140.

The glass substrate 150 may be provided in pair.

The 5G band transmissive body 100 may be provided between a pair of glass substrates 150. The redundant description of the 5G band transmissive body 100 will be omitted since it has been described previously.

The adhesive layer 140 may be provided between the 5G band transmissive body 100 and the glass substrate 150. The adhesive layer 140 provided on the upper side with respect to the 5G band transmissive body 100 may bond the upper glass substrate 150 and the pattern portion 120. The adhesive layer 140 provided on the lower side with respect to the 5G band transmissive body 100 may bond the lower glass substrate 150 and the base substrate 110.

With reference to (b) of FIG. 14, when the 5G band transmissive body 100*a* includes the pattern portion 1120 and the additional pattern portion 1121, the adhesive layer 140 provided on the upper side with respect to the 5G band transmissive body 100*a* may bond the upper glass substrate 150 and the upper pattern portion 1120. The adhesive layer 140 provided on the lower side with respect to the 5G band transmissive body 100*a* may bond the lower glass substrate 150 and additional pattern portion 1121.

The window assembly can transmit incident waves 10 of the 5G communication frequency band and visible light, making it suitable for applications such as vehicle windows and building windows.

The window assembly may be a glass assembly with a flat or curved surface.

The above description of the present invention is for illustrative purposes only, and it will be understood by those skilled in the art that various modifications and changes may be made thereto without departing from the spirit and scope of the invention. Therefore, it should be understood that the embodiments described above are exemplary and not limited in all respects. For example, each component described as a single type may be implemented in a distributed manner, and similarly, components described as distributed may be implemented in a combined form.

The scope of the present invention is determined by the claims stated below, and any modifications or variations that arise from the meaning and scope of the claims and their equivalence should be considered within the scope of the present invention.

INDUSTRIAL APPLICABILITY

The present invention is industrially applicable to the technical field of a 5G band transmissive body with high transmittance and low reflectance in the 5G band and a window assembly including the same.

The invention claimed is:

1. A 5th Generation (5G) band transmissive body comprising:

a base substrate; and a pattern portion provided on one side of the base substrate and transmitting 5G communication frequency band, wherein the pattern portion comprises a conductive pattern formed by providing conductive material in a plurality of virtual grid cells arranged in the horizontal and vertical directions and a plurality of unit areas divided by a virtual vertical line and a virtual horizontal line, which are orthogonally crossing at center of the pattern portion, and a pair of virtual diagonal lines crossing each other at the center and passing through the corners of the pattern portion, the conductive pattern being symmetrical with respect to each of the vertical line, horizontal line, or diagonal line in the neighboring unit areas among the plurality of unit areas, wherein at least one of the plurality of grid cells forms a unit cell pattern based on the conductive material being provided, and the conductive pattern comprises an auxiliary pattern formed, on one side of the base substrate, to increase a connected area between a pair of unit cell patterns adjacent in diagonal direction.

2. The 5G band transmissive body of claim 1, wherein the grid cells have the same size in the horizontal and vertical directions and are arranged in equal numbers in both the horizontal and vertical directions.

3. The 5G band transmissive body of claim 1, wherein the conductive pattern comprises an edge pattern formed of conductive material continuous on the grid cells arranged at the edges among the plurality of grid cells.

4. The 5G band transmissive body of claim 1, wherein the conductive pattern comprises a center pattern formed of conductive material on at least one of the plurality of grid cells located in the central area.

5. The 5G band transmissive body of claim 1, wherein the conductive pattern heats up based on voltage being applied.

6. The 5G band transmissive body of claim 1, wherein the auxiliary pattern is formed with an area smaller than that of the unit cell pattern.

7. The 5G band transmissive body of claim 1, wherein the auxiliary pattern is formed in pairs on each side with respect to the contact point of the unit cell patterns.

8. The 5G band transmissive body of claim 1, further comprising an auxiliary pattern portion formed on the other side of the base substrate and transmitting the 5G communication frequency band.

9. A window assembly comprising:

a pair of glass substrates;

a 5G band transmissive body of claim 1 and provided between the pair of glass substrates; and an adhesive layer provided between the 5G band transmissive body and the glass substrate.

* * * * *